United States Patent [19]

Fukumoto et al.

[11] Patent Number: 4,533,614
[45] Date of Patent: Aug. 6, 1985

[54] HEAT-FIXABLE DRY SYSTEM TONER

[75] Inventors: Hiroshi Fukumoto, Kawasaki; Sukejiro Inoue, Yokohama; Masumi Sasakawa, Tokyo; Shinji Doi, Kawasaki, all of Japan

[73] Assignee: Canon Kabushiki Kaisha, Tokyo, Japan

[21] Appl. No.: 499,548

[22] Filed: May 31, 1983

[30] Foreign Application Priority Data

Jun. 1, 1982 [JP] Japan ................................ 57-93568
Jul. 6, 1982 [JP] Japan ................................ 57-118235
Jul. 7, 1982 [JP] Japan ................................ 57-119065

[51] Int. Cl.³ .................... G03G 9/08; G03G 13/12
[52] U.S. Cl. ....................................... 430/99; 430/109; 430/904; 430/124
[58] Field of Search ................... 430/109, 99, 904

[56] References Cited

U.S. PATENT DOCUMENTS 2,221,776 11/1940 Carlson .
2,297,691 10/1942 Carlson .
2,618,552 11/1952 Wise .
3,590,000 6/1971 Palermiti et al. ................... 430/904
4,049,447 9/1977 Azar .................................... 430/107

Primary Examiner—John D. Welsh
Attorney, Agent, or Firm—Fitzpatrick, Cella, Harper & Scinto

[57] ABSTRACT

A toner, fixable sufficiently at lower temperatures to afford energy saving, particularly suitable for high speed fixing and also good in off-set resistance with a broad applicable temperature range for fixing, is obtained from a heat-fixable dry system toner comprising in a binder resin a non-linearly modified low melting polyester having an acid value of 10 to 60 obtained from components containing (A) an alkyl-substituted dicarboxylic acid and/or an alkyl-substituted diol, (B) a trivalent or more polycarboxylic acid and/or a trivalent or more polyol, (C) a dicarboxylic acid, and (D) an etherated diphenol.

32 Claims, No Drawings

HEAT-FIXABLE DRY SYSTEM TONER

BACKGROUND OF THE INVENTION

1. Field of the Invention

This invention relates to a toner for development of electrical latent images or magnetic latent images in electrophotography, electrostatic printing, etc. More particularly, the present invention relates to a heat-fixable dry system toner excellent in lower temperature fixability in a hot roller fixing system.

2. Description of the Prior Art

In the prior art, there have been known a number of electrophotographic methods as disclosed in U.S. Pat. Nos. 2,297,691, 3,666,363 and 4,071,361. Generally speaking, the electrophotographic method comprises forming electrical latent images on a photosensitive member by utilization of a photoconductive material according to various means, then developing said latent images by use of a toner, optionally transferring the toner images onto a transfer material such as paper, and thereafter fixing the developed images by heating, pressure or solvent vapor to obtain copied products.

As the method for development to visualize the electrical latent images by use of a toner, there have been known the powder cloud method as disclosed in U.S. Pat. No. 2,221,776, the cascade developing method as disclosed in U.S. Pat. No. 2,618,522, the magnetic brush method as disclosed in U.S. Pat. No. 2,874,063, and the method in which the electroconductive magnetic toner is employed as disclosed in U.S. Pat. No. 3,909,258.

The toner employed in development is generally prepared by mixing and dispersing a colorant into a thermoplastic resin, followed by micropulverization. As the thermoplastic resin, there have been widely used polystyrene resins, polyester resins, epoxy resins, acrylic resins, urethane resins or copolymer resins thereof. As the colorant, carbon black is used most widely, and black magnetic powders of iron oxide type are frequently used in case of magnetic toner.

As the system for fixing of a toner onto papers or other materials, there have been developed various methods and devices. Among them, frequently employed are systems by use of heat, as exemplified by the oven fixing system. Whereas, with the trend for miniaturization and speed-up of copying machine under the policy to make copying operations more efficient and energy-saving in recent years, the hot roller fixing system which is a pressure contact heating system advantageous in heat efficiency is becoming most popular. Such a system brings the toner image on a paper to be pressure contacted directly with a hot roller, and it is very advantageous in heat efficiency and also most suited for speed-up from the standpoint of fixability of toner onto a paper. On the other hand, such a system inherently involves serious problems. Shortly speaking, when the hot roller is maintained at a temperature at which the toner can be fixed, the toner is adhered not only onto the paper but also onto the hot roller surface, until the non-image area on the paper is contaminated after repeated copying, thus exhibiting the so called off-set phenomenon.

For overcoming or alleviating such problems, various countermeasures have been sought for in fixers and toners, but no satisfactory solution has yet been obtained.

So far as the fixer is concerned, there have been made contrivances such as coating the hot roller surface with an excellently releasing material such as Teflon, silicone, etc. simultaneously with coating of the roller surface with a releasing oil such as silicone oil also for the purpose of fatigue prevention. However, such an oil coating involves unfavorable problems in practical application such as complication of the fixer brought about by provision of an oil coating system as well as its cost.

With regard to the toner, it has been practiced to add waxes such as low molecular weight polyethylene, polypropylene, etc. for the purpose of increasing releasability thereof. However, for sufficient prevention of off-set, such a material is required to be added in a considerably large amount, which will result in deleterious effects such as increased agglomerating tendency, lowering of durability due to worsening of free flow property and instabilization of charging characteristics, etc.

As another method, improvements of binder resins have been considered. For example, U.S. Pat. No. 3,941,898 proposes a toner in which a crosslinked vinyl type polymer is used as the binder resin. According to this method, while marked improvements can be obtained in off-set resistance and entanglement resistance, there ensues the drawback that the increase of crosslinking degree will result in disadvantageous elevation of the fixing point. Also, the crosslinked vinyl type polymer suffers from the drawback that the toner using the crosslinked vinyl type polymer as the binder resin can give no good developing characteristic, because pigments can difficultly be dispersed therein or it is poorly compatible with other polymers. In particular, in case of a magnetic toner, there are many problems, because fixing temperature is elevated to worsen off-set resistance. To describe in more detail, for example, styrene-butyl acrylate is crosslinked with divinylbenzene to prepare various crosslinked resins having different degrees of crosslinking. Toners are prepared by use of these resins, and fixing characteristics and off-set resistances thereof are examined. Off-set is clearly difficulty caused as the crosslinking degree is higher, but contrariwise the fixing temperature is increased. By comparison between the crosslinked polymer and the non-crosslinked polymer, the former is clearly broadened in non-off-set fixing temperature range but it is not at a practically sufficient level for a fixing roller which is lowered through fatigue in releasability on the surface.

Moreover, for attempting a high speed fixing, the resin must inevitably be lowered in its molecular weight to have a lowered softening point, as contradictory to the measure for improvement of off-set resistance. This also necessarily leads to lowering of the glass transition point of the resin, whereby unfavorable phenomenon of blocking of toner during storage may be caused. In low-speed or medium-speed copying machines of the prior art, for which low temperature fixing is not required so much, these troubles were no problem at practical levels by employment of countermeasures as described above such as improvement of the fixer or other measures in the process, use of crosslinking, releasing agents, etc. However, the above dilemma has not basically been solved, and under the present situation, no toner is obtained, which is fixable from a very low temperature and yet excellent in off-set resistance and blocking resistance with a broad fixing temperature range.

Meanwhile, low molecular weight and amorphous polyester resins and epoxy resins are recently attracting attention as materials matching to low temperature fixing. Above all, attempts to use polyester resins as a binder for toner have been known, as disclosed in U.S. Pat. Nos. 3,590,000 and 3,681,106.

According to these disclosures and the experimental investigations by the present inventors, in the toner using a polyester resin as the binder, the fixing temperature can be generally lowered than that in case of other materials, such as styrene-acrylic resins conventionally widely used in the art, but improvement of off-set resistance has not yet been achieved.

The primary thought for off-set prevention in the toner using a polyester resin as the main binder was, as represented by U.S. Pat. No. 3,681,106, to aim at improvement of off-set resistance during fixing-melt by non-linearly modifying the polymer backbone by mixing a trivalent or more polyol or polyacid with the polymer thereby to impart rubbery elastic characteristics to the resin. The present inventors have also investigated variously on these Examples and found that these non-linear modifications are indeed effective for improvement of off-set resistance, but they also suffer the disadvantage similarly as in case of crosslinking of styrene type resins that the fixing point is elevated if non-linear modification is practiced to impart sufficient off-set resistance, thus failing to make avail of the advantage of low temperature fixability possessed by the polyester type resin. Also, as different from the improvement by crosslinking in styrene type resins, application of non-linear modification or crosslinking in polyester type resins will result in increase to a great extent of an acid value or a hydroxyl value of the resin obtained under the same reaction conditions. Probably due to this effect, humidity resistance was worsened and also it was found to have deleterious influences on charge characteristics. Then, in order to avoid such a phenomenon, experiments were repeated by changing variously the reaction conditions. As the result, when, for example, the polymerization time was sufficiently elongated, the acid value and the hydroxyl value were indeed made smaller, but crosslinking is progressed so far to result in marked elevation of the fixing temperature. According to the speculations by the present inventors, such results appear to reflect the fact that, in crosslinking under certain reaction conditions, the chances of association between the functional groups at the terminals to be reacted are extremely cancelled due to the so called steric hindrance, caused by the bulky structure like thread balls of the polymer backbone in the course of forming a three-dimensional network of the backbone at the stage of condensation.

On the other hand, there is also an attempt to prevent off-set by providing a "weak crosslinked structure" formed with metallic ions by mixing a polyester type resin with a polyvalent metal compound, thereby changing the melt-viscoelasticity of the resin through interactions between the polymer chains. The present inventors were also interested in this technique and attempted various experimental investigations. As the result, by addition of a metal compound, its effect with respect to off-set prevention on a heat roll was indeed confirmed to be obtained. However, in most of metal compounds, a considerably large amount of metal compound, namely 4 to 25 parts by weight based on 100 parts by weight of the binder resin, is required to be added in order to extract sufficiently its effect. For this reason, similarly as in case of a large amount of inorganic fillers added, probably due to increase in heat content, there appears markedly the defect of elevated fixing point. Also, due to incorporation of inorganic compounds lower in specific resistivity as compared with the polymer, the charge ability of the toner is cancelled to a considerable extent, to find that the toner tends to be worsened extremely in the developing characteristics. Thus, the method of adding a metal compound, although it may be good only with respect to improvement of off-set resistance, has a number of defects as mentioned above and therefore it is very difficult to say that this method is acceptable in commercial application. In spite of its effect, the essential point may be considered to reside in how the amount of the metal compound added can be suppressed. The present inventors have made much of this point and conducted sufficient investigations by varying systematically the kinds of the metal compounds and the partners of polyester resins. For the reason which has not yet been clarified, even when the same metal compound may be added in the same quantity, the improved effect of off-set and elevation of fixing point and the influence to worsen humidity resistance were found to be changed variously depending on the partner polyester resin. Although the influence by the acid value of the polyester resins may well be recognized, when the above actions were searched for the polyesters with the same constitution having various acid values, the results obtained were too diverse to point a particular tendency in a certain direction.

As can be seen from the disclosures in Japanese Laid-open Patent Applications Nos. 94362/1981, 116041/1981, and 166651/1980, a measure to improve off-set resistance has been found and is on the way to practical application, in which a polvalent metal compound is added to cause a kind of crosslinking, gellation. However, the reaction for imparting this crosslinkage is carried out between the solids while under molten state by heating, whereby the effect depends on the chances of association during kneading, and it is very difficult to control the kind and the amount of the metal compound, the reaction conditions, etc. which are very severe, and therefore it is hardly possible to control uniformly dispersions of various materials and maintain a definite degree of crosslinking.

These problems may be considered to be attributable to various unknown factors such as, for example, what extent of crosslinkage is necessary, absence of appropriate detection means therefore, what physical properties of the toner should be changed by crosslinking, etc.

This is why no polyester type toner has been realized, which is superior as overall characteristics over the styrene-acrylic type toner hitherto practiced frequently in the art, and the excellent characteristics of a polyester type toner fall to be utilized usefully to give no toner which can be fixed at lower temperatures, is free from off-set and good in storage stability, as required strongly at present time.

SUMMARY OF THE INVENTION

An object of the present invention is to provide a toner, which can be sufficiently fixed at lower temperatures to afford energy-saving, is particularly suitable for high-speed fixing, good in off-set resistance and broad in applicable fixing temperature range.

Another object of the present invention is to provide a toner having storage stability, which is free from blocking or agglomeration in a copying machine or even under a relatively high temperature atmosphere.

Still another object of the present invention is to provide a toner which can maintain stable charge characteristics within a broad humidity range and is excellent in developing characteristics.

Still another object of the present invention is to provide a toner, for which a hot roller fixer without coating of an oil can be applied.

Still another object of the present invention is to provide a toner excellent in developing characteristics, capable of giving image qualities which are light and clear with sufficient image densities, having sufficient resolutions without ground fog or other defects.

Still another object of the present invention is to provide a magnetic toner, which is good in dispersibility of magnetic powders and exhibits uniform magnetic properties in one component system magnetic toner, and which can be fixed by not roller fixing.

Further, still another object of the present invention is to provide a toner having good supplying and storage characteristics, which is excellent in free flow property, without causing agglomeration and is also excellent in impact resistance.

Still another object of the present invention is to provide a toner having a high frictional resistance against a mechanical load during the developing step, which is also excellent in impact resistance.

Still another object of the present invention is to provide a toner which is good in transfer characteristic with good transfer percentage which can be readily transferred from the electrostatic image forming surface to the image receiving surface, and without disturbance or ununiformness of images during transfer.

Still another object of the present invention is to provide a toner, which is not adhered onto or does not contaminate the toner holding members or the surface of the electrostatic latent image forming member.

Still another object of the present invention is to provide a toner, which is substantially free from carrier contamination caused by adhesion to or fusion with carriers in a two-component system developer.

Still another object of the present invention is to provide a toner having good cleaning property on the photosensitive surface through decrease in mechanical friction with the electrostatic image forming surface.

Still another object of the present invention is to provide a toner which can be produced easily and stably, and low in its production cost.

Still another object of the present invention is to provide a toner, which can be produced stably, by indicating clearly the detecting means and the appropriate range in order to find out the appropriate conditions during controlling of the kneading conditions in preparation of the toner.

Still another object of the present invention is to provide a toner of high value as a merchandise excellent in overall characteristics well balanced in various performances required for the toner as mentioned above.

The present inventors have made extensive studies about various polyester resins and consequently developed a low temperature fixable dry system toner for hot roller fixing in a specific class of polyesters, which can be non-linearly modified by introducing soft segments into the polymer backbones thereof without inducing the various defects as described above.

As one aspect, the present invention provides a heat-fixable dry system toner in which marked improvement in off-set is effected during non-linear modification by use of a bis-type polyester containing an etherated diphenol as the base, comprising an aromatic acid as the main acid component, and in which elevation of the fixing point and worsening of humidity resistance are effectively inhibited by introducing a specific alkyl-substituted dicarboxylic acid and/or alkyl-substituted diol as soft segments into the basic backbone of said polyester.

A more specific embodiment of this toner comprises a heat-fixable dry system toner comprising in a binder resin a non-linearly modified low melting polyester having an acid value of 10 to 60 obtained from components containing (A) an alkyl-substituted dicarboxylic acid and/or an alkyl-substituted diol, (B) a trivalent or more polycarboxylic acid and/or a trivalent or more polyol, (C) 50 mol. % or more of a dicarboxylic acid in the total acid component, and (D) an etherated diphenol.

The present inventors have also prepared systematically various samples of polyester resins of the system, in which an etherated bisphenol and a phthalic acid are employed as the backbone with non-linear modification by a trivalent or more aromatic carboxylic acid and, for the purpose of preventing fixing point elevation by the non-linear modification, the softening point is lowered by addition of a discarboxylic acid substituted by a relatively long chain alkyl group, and evaluated the overall characteristics of the toners obtained. As the result, by suppressing the degree of non-linear modification within a certain range and by adding a small amount of an organometallic compound containing a divalent or more metal, there could be achieved a toner which is markedly improved in off-set resistance and low temperature fixable without deleterious influence of worsening in humidity resistance as mentioned above and is also excellent in other overall characteristics. In the course of this investigation, it was also found that the effect of improvement of off-set resistance was greater when non-linearly modified as the content of an aromatic component in the polyester resin is greater, and also there was an appropriate and broad range in which no worsening of humidity resistance appeared. Above all, the resins comprising an etherated diphenol enriched in aromatic components and phthalic acid as the backbone were found to be excellent.

An embodiment of such a toner comprises a heat-fixable dry system toner comprising a binder resin, containing a non-linearly modified low melting aromatic polyester having an acid value of 10 to 60 obtained from components containing (A) 30 mole % or less of an alkyl-substituted dicarboxylic acid and/or an alkyl-substituted diol in the acid or alcohol component, (B) 40 mole % or less of a trivalent or more polycarboxylic acid and/or a trivalent or more polyol in the acid or alcohol components, (C) 60 mole % or more of a dicarboxylic acid of phthalic acid type in the dicarboxylic acid component and (D) an etherated diphenol, and 0.2 to 4 % by weight of an organometallic compound containing a divalent or more metal based on said binder resin.

Further, the present invention also provides a dry system toner for hot roller fixing, which is a toner using a polyester crosslinked with a polyvalent metal compound at the main binder resin, said toner having the melt-flow characteristics as measured by the flow-tester of a flowing point of 100° to 130° C. and a melt-flow viscosity of $10^4$ to $10^6$ poise at 110° C.

DESCRIPTION OF THE PREFERRED EMBODIMENTS

According to the speculations by the present inventors, it appears that the soft segments introduced into polymer backbones have the effect of loosening the crosslinked backbone to effectively lower the fixing point, further enhance the degree of freedom of functional groups to some extent and decrease residual COOH groups, OH groups, whereby humidity resistance can be improved. Besides, $C_6-C_{18}$ alkyl groups as soft segments are not incorporated into the main chain but branched to the main chain and therefore the toughness of the resin itself is not impaired. In other words, if incorporated into the main chain, the resulting polymer becomes similar to a linear polyester, which is certainly lowered in fixing point, but the resin becomes brittle and tends to be viscous on heat melting, whereby it is probable that off-set resistance may be worsened.

The soft segment components to be used in the polyester of the present invention may include saturated or unsaturated aliphatic dicarboxylic acids having alkyl substituents (preferably $C_6-C_{18}$) such as maleic acid, fumaric acid, glutaric acid, succinic acid, malonic acid, adipic acid, sebacic acid, azelaic acid, anhydrides thereof, esterified products thereof, and the like; and saturated or unsaturated aliphatic glycols having alkyl substituents (preferably $C_6-C_{18}$) such as ethylene glycol, 1,3-propylene diol, tetramethylene glycol, 1,5-pentyl diol, pentamethylene glycol, octamethylene glycol, nonamethylene glycol, decamethylene glycol, diethylene glycol, triethylene glycol, tetraethylene glycol and the like.

These soft segment components are also required to be contained in a polyester in an amount of 10 to 25% by weight, preferably in an amount of 15 to 20% by weight. At a level lower than 10% by weight, it is difficult to lower effectively the fixing point, while tendency for blocking is increased during storage at a level in excess of 25% by weight.

As trivalent or more polycarboxylic acids, including also esters thereof, it is possible to use 1,2,4-benzenetricarboxylic acid, 1,2,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methylenecarboxyl propane, 1,3-dicarboxyl-2-methyl2-methylenecarboxyl propane, tetra(methylenecarboxyl)methane, 1,2,7,8-octanetetracarboxylic acid and anhydrides thereof. Among the polycarboxylic acids, it is preferred to choose trimellitic acid, pyromellitic acid or anhydrides thereof so as to comprise at least 60 mole % of the polycarboxylic acids employed.

As the trivalent or more polyols, there may be applied polyhydroxy compounds having 3 to 12 carbon atoms and containing 3 to 9 hydroxyl groups. The preferred groups of polyhydroxy compounds are sugar alcohols and anhydrides thereof. Examples of these polyhydroxyl compounds are sorbitol, 1,2,5,6-hexanetetrol, glycerine, 1,4-sorbitane, pentaerythritol, dipentaerythritol, tripentaerythritol, xylitol, sucrose, 1,2,4-butanetriol, 1,2,5-pentanetriol, erythro-1,2,3-butanetriol, threo-1,2,3-butanetriol, 2-methylpropanetriol, 2-methyl-1,2,4-butanetriol, trimethylolethane, trimethylolpropane, 1,3,5-trihydroxymethylbenzene, and the like. Among the polyols, it is preferred to choose glycerine, pentaerythritol or sorbitol so as to comprise at least 60 mole % of the polyols employed.

If these trivalent or more polycarboxylic acid or/and polyols exceed 40 mole % of the acid or/and alcohol components, humidity resistance is worsened to make charge characteristics instable. If the sum of polycarboxylic acid and polyol is less than 10 wt. % based on the polyester, non-linearity is insufficient whereby off-set resistance tends to be worsened.

As the main acid component of the polyester, it is required to incorporate 50 mole % or more of an aromatic dicarboxylic acid, its analogous anhydride, other dicarboxylic acids, or esters thereof. Further, for imparting charge characteristics sufficient in electrophotographic characteristics, 50 mole % or more, preferably 60 mole % or more of the all dicarboxylic acid components are required to be aromatic dicarboxylic acids. As the aromatic dicarboxylic acids, there may be employed terephthalic acid, isophthalic acid, phthalic acid, diphenyl-p,p'-dicarboxylic acid, naphthalene-2,7-dicarboxylic acid, naphthalene-2,6-dicarboxylic acid, diphenylmethane-p,p'-dicarboxylic acid, benzophenone-4,4'-dicarboxylic acid, 1,2-diphenoxyethane-p,p'-dicarboxylic acid, and the like. Also, among the dicarboxylic acids, within the range of less than 40 mole %, it is possible to mix an aliphatic dicarboxylic acid, as exemplified by fumeric acid, maleic acid, succinic acid, cyclohexane dicarboxylic acid, malonic acid, adipic acid, glutaric acid, esters thereof, and anhydrides of thereof. If the aliphatic component exceeds 40 mole %, off-set resistance becomes insufficient as already described above and the effect of addition of a metal compound is vanished to result in worsening of humidity resistance, whereby the charge characteristic of the toner is changed to a great extent depending on the change in humidity. The aliphatic component should more preferably be contained in a proportion of 30 mole % or less.

Illustrative of the etherated phenols which can be used are polyoxystyrene (6)-2,2-bis(4-hydroxyphenyl)propane, polyhydroxybutylene(2)-2,2-bis(4-hydroxyphenyl)propane, polyoxyethylene(3)-2,2-bis(4-hydroxyphenyl)propane, polyoxypropylene(3)-bis(4-hydroxyphenyl)thioether, polyoxyethylene(2)-2,6-dichloro-4-hydroxyphenyl, 2',3',6'-trichloro-4'-hydroxyphenylmethane, polyoxypropylene(3)-2-bromo-4-hydroxyphenyl, 4-hydroxyphenylether, polyoxyethylene(2,5)-p,p-bisphenol, polyoxybutylene(4)-bis(4-hydroxyphenyl)ketone, polyoxystyrene(7)-bis(4-hydroxyphenyl)ether, polyoxypentylene(3)-2,2-bis(2,6-diiodo-4-hydroxyphenyl)propane, and polyoxypropylene(2,2)2,2-bis(4-hydroxyphenyl)propane.

One group of etherated diphenols is etherated bisphenols. A preferred group of etherated bisphenols include ethoxylated or propoxylated bisphenols, having 2 to 3 moles of oxyethylene or oxypropylene per mole of bisphenol, and having propylene or sulfone group as R. Examples of this group are polyoxyethylene(2,5)-bis(2,6-dibromo-4-hydroxyphenyl)sulfone, polyoxypropylene(3)-2,2-bis(2,6-difluoro-4-hydroxyphenyl)propane, and polyoxyethylene(1,5)-polyoxypropylene(1,0)-bis(4-hydroxyphenyl)sulfone.

Another preferable group of etherated bisphenols falling within the group characterized by the above formula includes polyoxypropylene-2,2'-bis(4-hydroxyphenyl)propane and polyoxyethylene- or polyoxypropylene-2,2-bis(4-hydroxy, 2,6-dichlorophenyl)propane (2.1 to 2.5 units of oxyalkylene per mole of bisphenol).

The polyester to be used in the present invention may have a glass transition temperature preferably of 50° to 80° C. and a softening point preferably of 60° to 130° C. When the glass transition temperature is lower than 50° C. or the softening point is lower than 60° C., the resulting toner tends to suffer from blocking during storage. On the other hand, when the glass transition temperature exceeds 80° C. or the softening point exceeds 130° C., an excessive heat is required during fixing to impair the intended low temperature fixing characteristic.

The polyester used in the present invention also has an acid value of 10 to 60, preferably 20 to 50. With an acid value less than 10, non-linearity modification will progress so far that the fixing point is elevated, while with an acid value more than 60, humidity resistance is worsened.

The present inventors have also made various investigations about metal compounds to be combined with the polyester and found that those having sufficient effect when added in a small amount and having no deleterious influence are extremely limited, and they must be organic metal compounds, which are highly decomposable by heat, in this regard. Among them, particularly effective are acetylacetone type metal complexes and salicylic acid type metal compounds.

It has been also found that the means to add a relatively long chain alkyl group to the polyester resin backbone is also effective for lowering the fixing point and that, through the synergistic effect by combination of these, the toner can be made to have good overall performance suited for various kinds of machines.

As the result of detailed analysis of the techniques which have remained very vague and suitable combination thereof, only the effective functions were extracted from respective techniques, by removing the deleterious effects in case of the technique of non-linearity modification of the polyester alone and also removing the deleterious effects by addition of a large amount of metal compounds according to the technique of metal crosslinking with metal compounds.

That is, with a constitution of a limited species of aromatic polyester resins comprising an etherated diphenol and phthalic acid as backbone weakly modified to non-linearity with a trivalent or more polycarboxylic acid or polyol to which a very small amount of a certain kind of metal compounds is added, there was obtained a toner having excellent effects.

The organic metal compound available in the toner of the present invention may include organic salts or complexes including divalent or more metals. As effective metal species, there may be included polyvalent metals such as Al, Ba, Ca, Cd, Co, Cr, Cu, Fe, Hg, Mg, Mn, Ni, Pb, Sn, Sr, Zn, etc. As the organic metal compounds, there may effectively be employed oxides, hydroxides, carboxylates, alkoxylates, organic metal complexes, chelate compounds of the above metals. Preferable examples may include zinc oxide, magnesium oxide, aluminum oxide, aluminum hydroxide, ferric hydroxide, zinc acetate, magnesium acetate, calcium acetate, aluminum acetate, magnesium stearate, calcium stearate, aluminum stearate, aluminum isopropoxide, aluminum n-butoxide, aluminum acetylacetonate, iron (II) acetylacetonate, chromium 3,5-di-tert-butylsalicylate and the like. In particular, acetylacetone metal complexes and salicylic acid type metal salts are preferred. The amount to be added should not exceed 4% by weight based on the binder resin in order to avoid the deleterious influences as mentioned above, but substantial effect will disappear at a level less than 0.2%.

The present inventors have correlated the degree of crosslinking, which has been difficult in crosslinking of a polyester with a metal compound in the prior art, with the melt-flow characteristics of the resin or the toner, searched for a large number of instruments for examination of melt-flow characteristics of resins, prepared toner samples and their fixing characteristics were evaluated and correlated with the melt-flow characteristics thereof measured by the instruments for measurement of the melt-flow characteristics. As the result, it could be found that, in the toner comprising the main binder resin of a polyester type resin crosslinked with a metal compound, its off-set characteristic did not depend substantially on the kind of the metal compound, its amount and the kind of the polyester, but a good toner could be obtained so long as it has a flowing point and a melt-flow viscosity as measured by a flow-tester which is within a certain range not found in the toners of the same type hitherto disclosed. According to this method, the present inventors successively obtained a polyester type toner which could be fixed at low temperature and is free from off-set with good storage stability.

In the present invention, the flow-tester refers to Model CFT-500 produced by Shimazu Seisakusho which is widely employed to know the melt-flow characteristics such as melt-flow viscosity, flowing performance, etc. of various synthetic resins or others.

The flowing point (Tf) used in the present invention refers to a temperature which exhibits a flow-out rate of $10^{-3}$ cm$^3$/sec. The melt-flow viscosity refers to an apparent viscosity determined from the flow-out rate.

Here, these values will vary depending on the conditions at the time of measurement, as a matter of course. For avoiding vagueness in this respect, the measurement conditions are defined as follows. That is, in the present invention, the results were obtained according to measurements under the conditions of a constant temperature elevation speed of 5° C./min., a loading pressure of 50 kg/cm$^2$, with the use of a nozzle of 0.5 mm in diameter and 1 mm in length.

The present inventors have prepared a large number of toner samples by application of metal crosslinking on various polyesters for detailed examination of the correlation between the flow characteristics and the fixing characteristics of toners to obtain the following results.

The flowing point by the flow-tester has a considerably distinct correlation with the fixing temperature of the toner during hot roll fixing, and the higher the flowing point is, the higher is the fixing temperature. As the flowing point is lower, fixing can be effected at lower temperature when the fixing speed is made constant, while sufficient fixing can be effected at higher speed when the heat supplied to the fixing roller is made constant. When flowing points and fixing temperatures were measured by the flow-tester for toners using various polyesters, the binder resins as defined in claims have been found to be good as the binder resins for heat fixing toner which are lower in fixing temperature and scarce of occurrences of various problems concerning fixing process such as off-set or others.

Also, if the flowing point is too high, the fixing point is increased to lose the advantage as a polyester.

On the contrary, if it is too low, blocking resistance during storage will be bad as already described.

Further, when various polyesters containing polyvalent metal compounds are used as binder resins for toners, the relation between the crosslinking degree and the flow characteristics by the flow-tester and the fixing characteristics by hot roll fixing may be shown as follows.

If the crosslinking degree of the binder resin is large, off-set resistance is good, but the fixing point is high. The flow characteristics in this case are high flowing point and large melt-flow viscosity. On the other hand, if the crosslinking degree is small, the flowing point is low, but the off-set resistance is insufficient. In terms of flow characteristics, the flowing point is low, but the melt-viscosity is low. By use of a polymer having flow characteristics with an appropriate range, there can be obtained a toner which is not so high in fixing point and yet also excellent in off-set resistance.

As described above, the effect of melt-flow characteristics of a toner on the fixing characteristics of the toner is very great. Accordingly, in a polyester type polymer, no good overall fixing performance can be exhibited unless crosslinking is applied on the polymer so as to impart melt-flow characteristics within a suitable range thereto. Said crosslinking will be changed variously depending on the kind and the amount of the polyvalent metal, and the temperature and time during thermal reaction. Therefore, for obtaining a toner having a fixing performance of good characteristics, recourse must be made to a number of trials and errors, which, however, were found to be easily done without dependence of the kind and the amount of the metal compound, the kind and the amount of the polyester or the reaction time and temperature, only if the flow characteristics have been determined. This method is also very useful and of a high commercial value in production of a polyester type toner with a constant performance.

It is also possible to use by way of mixing or modification in the binder resin of this invention a known thermoplastic resin within a range which does not impair the performance of the present invention, namely in an amount of 40% by weight or less, such as other polyester resins than those of the present invention, urethane resins, epoxy resins, ethylene-ethyl acrylate resins, phenol resins, styrene-butadiene resins, xylene resins, butyral resins, etc. The amount of these resins formulated may more preferably be not more than 20% by weight in the binder resin for toner. Among these thermoplastic resins, styrene-acrylic resins are preferred.

As the colorants to be used in the toner of the present invention, there may be used all of those known in the art, as exemplified by carbon black, iron black, Nigrosine, Benzidine Yellow, Quinacridone, Rhodamine B, Phthalocyanine Blue, etc.

Also, magnetic powders may also be incorporated in the toner of the present invention so that it can be used as a magnetic toner. As such toners, there may be used substances which can be magnetized when placed in a magnetic field, as exemplified by powders of strongly magnetic metal such as iron, cobalt, nickel, etc. or compounds such as magnetite, hematite, ferrite, etc. When an iron oxide type magnetic material is used as colorant, it may preferably incorporated in the toner in an amount of 20 to 60% by weight.

It is also possible to add additives to the toner of the present invention for various purposes. As such additives, there are charging controlling materials such as metal complexes, Nigrosine, etc.; lubricant compounds such as polytetrafluoroethylene, polyethylene, polypropylene, fatty acids or metal salts thereof, bisamides thereof, etc.; and plasticizers such as dicyclohexyl phthalate; and others. In particular, the fixing characteristic of the toner according to the present invention can be improved additionaly by incorporating a very small amount, namely 0.1 to 5% by weight (preferably 0.2 to 3% by weight) of an ethylenic olefin polymer having a melt-flow viscosity at 140° C. of 10 to $10^6$ CPS, preferably $10^2$ to $10^5$ CPS, such as polyethylene, polypropylene, ethylene-propylene copolymer, ethylene-vinyl acetate copolymer, ethylene-ethyl acrylate copolymer, ionomer having a polyethylene backbone, etc.

Further, the toner of the present invention can be mixed, if desired, with carrier particles such as iron powders, glass beads, nickel powders, ferrite powders, etc. to be used as a developer for electrical latent images. Also, for the purpose of improving free flow property of the powders, the toner of the present invention can be mixed with fine powders of hydrophobic colloidal silica or, for the purpose of prevention of toner adhesion, with fine abrasive particles such as of cerium oxide.

As the method for fixing the developing powder of the present invention onto a support, there may be applied any of the known hot roll fixing systems. As the result of various tests, a fixer in which the surface material of the fixing roller is made of a fluorine type resin was found to be most preferable.

The present invention is described in detail by referring to the following Preparation Examples and Examples, by which the present invention is not limited at all. Parts are parts by weight.

PREPARATION EXAMPLE 1

Preparation of Polyester A

Into a four-necked round bottomed flask equipped with a thermometer, a stirrer, an inlet made of glass and a flow-down system agglomerator were introduced 1810 g of polyoxypropylene (2,2)-2,2-bis(4-hydroxyphenyl)propane, 110 g of sorbitol and 174 g of ethylene glycol having an alkyl substituent having 8 carbon atoms. A nitrogen gas was flown through the inlet made of a glass to stir the polymer blend and make inert the atmosphere in the reaction vessel.

Then, while continuing stirring, the mixture was heated to 50° C. and 830 g of terephthalic acid, 420 g of trimellitic acid and 432 g of malonic acid having an alkyl substituent with 8 carbon atoms were added into the reaction vessel. After the reaction was carried out at 210° C. for 5 hours, the system was brought gradually to a reduced pressure. At about 100 mm Hg, the reaction was carried out and, when the softening point of the resin became 100° C., the reaction was terminated.

The resultant resin had a glass transition temperature of 62° C., an acid value of 25.0, a number average molecular weight of 6,500 and a weight molecular weight of 74,800.

PREPARATION EXAMPLE 2

Preparation of Polyester B

Similarly as in Example 1, 2113 g of polyoxyethylene (2,2)-2,2-bis(4-hydroxyphenyl)propane, 47.6 g of glycerine and 206 g of 1,3-propylene glycol having an alkyl substituent having 10 carbon atoms were introduced in the reaction vessel, and the atmosphere was made inert.

Then, while continuing stirring, the mixture was heated and 830 g of terephthalic acid, 635 g of pyromellitic acid and 572 g of succinic acid having an alkyl substituent having 10 carbons were added into the reaction vessel. After the reaction was carried out at 210° C. for 5 hours, the system was brought gradually to a reduced pressure. At about 100 mm Hg, the reaction was carried out and, when the softening point of the resin became 95° C., the reaction was terminated.

The resultant resin had a glass transition temperature of 55° C., an acid value of 35.5, a number average molecular weight of 4,800 and a weight average molecular weight of 43,200.

PREPARATION EXAMPLE 3

Preparation of Polyester C

Preparation Example 1 was repeated except that ethylene glycol having an alkyl substituent with 8 carbon atoms and malonic acid were not added. The acid value was not lowered when the reaction time and the reaction temperature were variously varied, and the reaction was terminated when the acid value became 75.

The resultant resin had a glass transition temperature of 85° C., a softening point of 142.5° C., a number average molecular weight of 8,600 and a weight average molecular weight of 11,600.

PREPARATION EXAMPLE 4

Preparation of Polyester D

Preparation Example 1 was repeated except that the amount of malonic acid having an alkyl substituent with 8 carbon atoms was changed to 648 g and that of ethylene glycol having an alkyl substituent with 8 carbon atoms to 532 g. The reaction was terminated when the acid value of the resin became 20. The resultant resin had a glass transition temperature of 45° C., a softening point of 83° C., a number average molecular weight of 3,800 and a weight average molecular weight of 49,400.

PREPARATION EXAMPLE 5

Preparation of Polyester E

Preparation Example 1 was repeated except that sorbitol and trimellitic acid were not added. The reaction was terminated when the softening point of the resin became 95° C.

The resultant resin had a glass transition temperature of 60° C., an acid value of 22.5, a number average molecular weight of 4,500 and a weight average molecular weight of 26,100.

PREPARATION EXAMPLE 6

Preparation of Polyester F

Polyoxypropylene (2,5)-2,2-bis(4-hydroxyphenyl)propane (545 parts) was charged into a four-necked flask, followed by setting of a stirrer, a condenser, a thermometer and a gas introducing inlet on the flask, which was then placed in a mantle heater. After replacing internally of the reaction vessel with nitrogen gas, the contents were heated to 50° to 60° C., whereupon 135 parts of terephthalic acid, 77 parts of succinic acid having a $C_{12}$ alkyl substituent ($C_{16}H_{30}O_4$) and 38 parts of trimellitic acid were added so as to adjust the content of carboxyl groups to 0.9 equivalent per one equivalent of hydroxyl group. This mixture system was heated to 210° C. under stirring. While removing the water formed by the reaction, the reaction was monitored every hour after elapse of about 5 hours by measurement of acid value for the purpose of finding completion of the reaction. When the acid value reached about 30, the reaction product was cooled to room temperature.

PREPARATION EXAMPLE 7

Preparation of Polyester G

Following the same procedure as in Preparation Example 6, 545 parts of polyoxypropylene (2,5)-2,2-bis(4-hydroxyphenyl)propane was charged into a flask, followed by replacement with nitrogen and heating to 50° C. Then, 135 parts of isophthalic acid, 77 parts of succinic acid substituted with $C_{12}$ alkyl and 38 parts of trimellitic acid were added into the flask, and the resulting mixture was heated to 210° C. under stirring to carry out the reaction. After completion of the reaction, the reaction product was cooled to room temperature.

PREPARATION EXAMPLE 8

Preparation of Polyester H

Following the same procedure as in Preparation Example 6, 545 parts of polyoxypropylene (2,5)-2,2-bis(4-hydroxyphenyl)propane was charged into a flask, followed by replacement with nitrogen and heating to 50° C. Then, 108 parts of terephthalic acid, 24 parts of adipic acid, 77 parts of succinic acid substituted with $C_{12}$ alkyl and 38 parts of trimellitic acid were added into the flask, and the mixture was heated to 210° C. under stirring to carry out the reaction. After completion of the reaction, the reaction product was cooled to room temperature.

PREPARATION EXAMPLE 9

Preparation of Polyester I

Following the same procedure as in Preparation Example 6, 436 parts of polyoxypropylene (2,5)-2,2-bis(4-hydroxyphenyl)propane and 18 parts of glycerine were charged into a flask, followed by replacement with nitrogen and heating to 50° C. Then, 179 parts of terephthalic acid and 77 parts of succinic acid substituted with $C_{12}$ alkyl were added into the flask, and the mixture was heated to 210° C. under stirring to carry out the reaction. After completion of the reaction, the reaction product was cooled to room temperature.

PREPARATION EXAMPLE 10

Preparation of Polyester J

Following the same procedure as in Preparation Example 6, 436 parts of polyoxypropylene (2,5)-2,2-bis(4-hydroxyphenyl)propane and 64 parts of ethylene glycol substituted with $C_8$ alkyl ($C_{10}H_{22}O_2$) were charged into a flask, followed by replacement with nitrogen and heating to 50° C. Then, 179 parts of terephthalic acid and 38 parts of trimellitic acid were added into the flask, and the mixture was heated to 210° C. under stirring to carry out the reaction. After completion of the reaction, the reaction product was cooled to room temperature.

PREPARATION EXAMPLE 11

Preparation of Polyester K

Following the same procedure as in Preparation Example 6, 545 parts of polyoxypropylene (2,5)-2,2-bis(4-hydroxyphenyl)propane was charged into a flask, followed by replacement with nitrogen and heating to 50° C. Then, 112 parts of terephthalic acid and 95 parts of trimellitic acid were added into the flask, and the mixture was heated to 210° C. under stirring to carry out the reaction. After completion of the reaction, the reaction product was cooled to room temperature.

PREPARATION EXAMPLE 12

Preparation of Polyester L

Following the same procedure as in Preparation Example 6, 545 parts of polyoxypropylene (2,5)-2,2-bis(4-hydroxyphenyl)propane was charged into a flask, followed by replacement with nitrogen and heating to 50° C. Then, 135 parts of terephthalic acid and 155 parts of succenic acid substituted with $C_{12}$ alkyl were added into the flask, and the mixture was heated to 210° C. under stirring to carry out the reaction. After completion of the reaction, the reaction product was cooled to room temperature.

PREPARATION EXAMPLE 13

Preparation of Polyester M

Into a flask were charged 863 parts of dimethyl terephthalate, 728 parts of neopentyl glycol, 228 parts of propylene glycol, 27 parts of trimethylolpropane and 0.43 part of zinc acetate and the esterification reaction was carried out at 140°-220° C. for 3 hours. Then, the reaction system was reduced to several Torr and thereafter to less than 1 Torr, and polycondensation reaction was carried out at 240° C. for 30 minutes. Then, 58 parts of trimellitic acid anhydride were added and the reaction was carried out at around 240° C. for 30 min. to obtain Polyester M.

PREPARATION EXAMPLE 14

Preparation of Polyester N

Into an autoclave were charged 498 parts of terephthalic acid, 97 parts of ethylene glycol, 424 parts of neopentyl glycol, 48 parts of trimethylolpropane and 0.6 part of dibutyltin oxide, and the esterification reaction was carried out at 220°-240° C. for 5 hours, followed by addition of 266 parts of isophthalic acid to carry out the esterification reaction in a nitrogen stream at 240° C. for 8 hours. Then, 40 parts of succinic acid anhydride was added and the reaction was carried out at 235°-240° C. for 20 minutes to obtain Polyester N.

PREPARATION EXAMPLE 15

Preparation of Polyester P

Similarly as in Preparation Example 13 or 14, Polyester P was prepared by use of 76 parts of terephthalic acid, 4 parts of trimellitic acid and 20 parts of sebacic acid as acid components, 58 parts of ethylene glycol and 42 parts of neopentyl glycol as alcohol components.

EXAMPLES 1-2, COMPARATIVE EXAMPLES 1-4

Seven kinds of resins of Polyesters A–F and styrene-butyl acrylate copolymer were made into toners, respectively, in the following manner.

| | |
|---|---|
| Resin | 100 wt. parts |
| Magnetic powder EP-1000 | 60 wt. parts |
| (Magnetite produced by Toda Kogyo) | |
| PE-130 (Low molecular weight polyethylene produced by Hoechst Japan) | 2 wt. parts |

The mixture according to the above formulation was kneaded by heating on a hot roll at 150° C. for 15 minutes, left to cool and then crushed, followed further by micro-pulverization by a jet-mill pulverizer. Then, classification of the resultant particles by means of Alpine classifier gave a finely pulverized product with a certain particle size distribution having an average particle size of 10-12μ. The finely pulverized product was mixed with 0.3 wt. part of colloidal silica (R-972) to provide a toner for visualization.

Evaluation of fixing characteristic was performed by taking out the fixing unit of NP-400 RE copying machine, and using instead thereof another fixer in which the hot roller temperature can be controlled from 100° C. to 250° C. and the linear velocity is variable from 100 to 500 mm/sec. The nip width was set at 8.5 mm, and the hot roller was coated on its surface with Teflon, and evaluation of the off-set property and the fixing point were conducted without application of oil coating.

Evaluation of blocking tendency was conducted after leaving 20 g of the toner to stand in a thermostat tank set at 50° C. for 24 hours, followed by allowing to cool to room temperature, and judgement was made based on the extent of agglomeration.

The results are shown in Table 1.

TABLE 1

| | Binder resin employed | Initial fixing temperature | Off-set initiating temperature | Fixable temperature range | Blocking tendency |
|---|---|---|---|---|---|
| Example 1 | Polyester A | 120° C. | 200° C. | 80° C. | O |
| Example 1' | Polyester A | 140° C. | 210° C. | 70° C. | O |
| Example 2 | Polyester B | 120° C. | 200° C. | 80° C. | O |
| Comparative Example 1 | Polyester C | 140° C. | 220° C. | 80° C. | O |
| Comparative Example 1' | Polyester C | 160° C. | 220° C. | 60° C. | O |
| Comparative Example 2 | Polyester D | 100° C. | 180° C. | 80° C. | X |
| Comparative Example 3 | Polyester E | 110° C. | 120° C. | 10° C. | O |
| Comparative Example 4 | Styrene-butyl acrylate copolymer | 160° C. | 200° C. | 40° C. | O |

Example 1' and Comparative Example 1' are evaluation results at the linear velocity of 500 mm/sec of hot roller, while others are those at 250 mm/sec.

By use of NP-400 RE copying machine, continuous image formation of 10,000 sheets was performed with the toners of Examples 1 and 2 under normal temperature and normal humidity, whereby clear images without fog could be obtained to the end, thus exhibiting sufficient fixing characteristics and off-set resistances.

Also, neither blocking nor agglomeration occurred during storage in a hopper of a development vessel.

When image formation was performed at 5° C. by use of NP-400 RE copying machine with the toners of Comparative Examples 1 and 4 continuously to 99 sheets, the images were clear and good, but insufficient in fixing characteristic. In case of the toner of Comparative Example 1, in the sheets of 90th paper et seq., the toner was peeled off when lightly rubbed with a hand. In case of the toner of Comparative Example 4, similar phenomenon was exhibited in the sheets of 10th paper et seq. When similar image formation was performed with the toner of Comparative Example 3 under normal temperature and normal humidity, off-set appeared in the image within 10 sheets.

Further, when the toner of Comparative Example 1 was left to stand under a high humid atmosphere of 85% RH at 35° C. for 24 hours and used for image formation by means of NP-400 RE copying machine, the image density was low and image flowing also occurred.

EXAMPLE 3

A mixture comprising 100 parts of Polyester F of Example 6, 2 parts of a low molecular weight polypropylene (Viscol 660 P, produced by Sanyo Kasei Kogyo), 2 parts of iron acetylacetonate and 8 parts of carbon black (Regal 400 R, produced by Cabot) was kneaded by heating on a roll mill. The kneaded product was cooled, crushed by a cutter mill and then micropulverized by a ultrasonic jet mill into a toner with an average particle size of about 8 $\mu$. This toner (15 parts) was mixed with 85 parts of carrier iron powders (EFV 200/300 produced by Nippon Teppun) and supplied to a commercially available copying machine (NP-5000 produced by Canon) to perform development. As the result, the initial image and the image on copying of 5,000 sheets in the durable test were free from fog with sufficient density, thus involving no problem at all. In the durability test up to 5,000 sheets, there was also observed no problem concerning fixing characteristic. For the purpose of examining in detail about fixing characteristic, the fixer portion of a commercially available copying machine (NP-400 RE produced by Canon) was separately prepared and the unfixed image prepared separately on a transfer paper was subjected to the fixing test by this separate fixer by varying the setting temperature on the surface of the roller, whereby the fixing point (the minimum temperature at which fixing is practically sufficient) was sufficiently low and no off-set phenomenon occurred over a wide temperature range. Further, when this toner was left to stand in an atmosphere of 50° C., no such phenomenon as H; blocking, caking, etc. was observed. Also, when image formation was effected under a highly humid atmosphere, the same image characteristic as under normal temperature and normal humidity was maintained without any problem at all.

EXAMPLE 4

Toner was prepared and subjected to evaluation according to entirely the same procedure as in Example 3 except for using one part of nickel acetylacetonate in place of 2 parts of iron acetylacetonate. As to the result, the initial image and durable test image were very good without any problem, and the results of the fixing test, storage test and high humidity test by use of a separate fixer were substantially the same as in Example 3 without any problem.

EXAMPLE 5

Toner was prepared and subjected to evaluation according to entirely the same procedure as in Example 3 except for using 3 parts of chromium 3,5-di-t-butylsalicylate in place of 2 parts of iron acetylacetonate. As the result, the initial image and durable test image were very good without any problem, and the results of the fixing test, storage test and high humidity test by use of a separate fixer were substantially the same as in Example 3 without any problem.

EXAMPLE 6

Toner was prepared and subjected to evaluation according to entirely the same procedure as in Example 3 except for using one part of aluminum isopropylate in place of 2 parts of iron acetylacetonate. As the result, the initial image and durable test image were very good without any problem, and the results of the fixing test, storage test and high humidity test by use of a separate fixer were substantially the same as in Example 3 without any problem.

EXAMPLE 7

A mixture comprising 100 parts of Polyester F of Example 6, 2 parts of a low molecular weight polypropylene (Viscol 660 P, produced by Sanyo Kasei Kogyo), 2 parts of iron acetylacetonate and 60 parts of magnetic powders (EPT-500 produced by Hirata Kogyo) was kneaded by heating on a roll mill. The kneaded product was left to cool, then crushed by a cutter mill and micropulverized by a ultrasonic jet mill, followed by classification by a wind force classifier, into toner particles with sizes of about 5 to 20 $\mu$ and an average size of about 12$\mu$. This toner was mixed with colloidal silica (R-972 produced by Aerosil Co.) and supplied to a commercially available one-component developing system copying machine (NP-400 RE produced by Canon) to perform development. As the result, sufficient image density and development durability could be obtained without any problem in fixing. For the purpose of examining in detail about fixing characteristic as in Example 3, the fixer portion of the above-mentioned commercially available copying machine was separately prepared and the unfixed image prepared separately on a transfer paper was subjected to the fixing test by this separate fixer by varying the setting temperature on the surface of the roller, whereby the fixing point was sufficiently low and no off-set phenomenon occurred over a wide temperature range. Further, when image formation was performed under a highly humid atmosphere similarly as in Example 3, the result was satisfactory substantially similarly as under normal temperature and normal humidity. When this toner was left to stand for a long time under an atmosphere of 50° C., neither blocking nor caking was observed.

EXAMPLE 8

Toner was prepared and evaluated according to the same procedure as in Example 3 except for using 100 parts of Polyester G of Preparation Example 7 in place of 100 parts of Polyester F of Preparation Example 6. The results obtained were satisfactory substantially similarly as in Example 3.

EXAMPLE 9

Toner was prepared and evaluated according to the same procedure as in Example 7 except for using 100 parts of Polyester G of Preparation Example 7 in place of 100 parts of Polyester F of Preparation Example 6. The results obtained were satisfactory substantially similarly as in Example 7.

EXAMPLE 10

Toner was prepared and evaluated according to the same procedure as in Example 3 except for using 100 parts of Polyester H of Preparation Example 8 in place of 100 parts of Polyester F of Preparation Example 6. The results obtained were satisfactory substantially similarly as in Example 3.

EXAMPLE 11

Toner was prepared and evaluated according to the same procedure as in Example 7 except for using 100 parts of Polyester H of Preparation Example 8 in place of 100 parts of Polyester F of Preparation Example 6. The results obtained were satisfactory substantially similarly as in Example 7.

EXAMPLE 12

Toner was prepared and evaluated according to the same procedure as in Example 3 except for using 100 parts of Polyester I of Preparation Example 9 in place of 100 parts of Polyester F of Preparation Example 6. The results obtained were satisfactory substantially similarly as in Example 3.

EXAMPLE 13

Toner was prepared and evaluated according to the same procedure as in Example 3 except for using 100 parts of Polyester J of Preparation Example 10 in place of 100 parts of Polyester F of Preparation Example 6. The results obtained were satisfactory substantially similarly as in Example 3.

EXAMPLE 14

Toner was prepared and evaluated according to the same procedure as in Example 3 except for using 70 parts of Polyester F of Preparation Example 10 and 30 parts of a styrene-butyl acrylate copolymer (styrene/butyl acrylate molar ratio=70/30, weight average molecular weight=352,000) in place of 100 parts of Polyester F of Preparation Example 6. Although the fixing point was slightly increased, fixing can be effected at a sufficiently low temperature and the results obtained were satisfactory substantially similarly as in Example 3.

COMPARATIVE EXAMPLE 5

Toner was prepared and evaluated according to the same procedure as in Example 3 except for using no iron acetylacetonate. As the result, the image was substantially as good as that in Example 3, but off-set phenomenon remarkably appeared soon and, after copying some ten sheets of copying, off-set toner which could not be wiped off with the cleaning web of the fixer passed through the web to appear as black lines on the image, thus failing to be practically useful. When the fixing characteristic was examined in detail by a separate fixer, the fixing point was slightly lower than in case of Example 3, but it exhibited inferior thermal characteristics such that no practical fixing region existed with appearance of off-set immediately after fixation.

COMPARATIVE EXAMPLE 6

Toner was prepared and evaluated according to the same procedure as in Example 3 except for using 10 parts of iron acetylacetonate. As the result, although no off-set phenomenon occurred as different from Comparative Example 5, the fixing point was elevated higher by about 20° C. than that in case of Example 3. When image formation test was conducted under a highly humid environment, the image was considerably thin, being lowered in reflection density to about ⅔ of that at normal humidity, to prove that the toner was not practically useful.

COMPARATIVE EXAMPLE 7

Toner was prepared and evaluated in the same manner as in Example 3 except for using 2 parts of magnesium oxide (tradename, "Kyowamag", supplied by Kyowa Kagaku Kogyo) in place of using 2 parts of iron acetylacetonate in Example 3. As the result, off-set phenomenon substantially the same as in Comparative Example 5 appeared intensely to give only inferior results.

COMPARATIVE EXAMPLE 8

Toner was prepared and evaluated in the same manner as in Example 3 except for using 100 parts of Polyester K of Preparation Example 11 in place of 100 parts of Polyester F of Preparation Example 6. As the result, the fixing point was elevated higher by about 20° C. than that in case of Example 3. It was found to be also inferior in humidity resistance, with the image density at the time of image formation under a highly humid environment being about 70% of that under normal humidity.

COMPARATIVE EXAMPLE 9

Toner was prepared and evaluated in the same manner as in Example 3 except for using 100 parts of Polyester L of Preparation Example 12 in place of 100 parts of Polyester F of Preparation Example 6. As the result, off-set phenomenon substantially the same as in Comparative Example 5 occurred intensely. The difference from Comparative Example 5 was that the fixing point was further lowered to be lower by about 15° C. than that of Example 3. Shortly speaking, this may be considered to be due to a considerable lowering in softening point, and in the storage test at 50° C., toners were agglomerated with each other after about 10 hours to exhibit clearly occurrence of blocking phenomenon until the toner powder as a whole became a piece of block after left to stand for one day, thus being not practically useful at all.

EXAMPLE 15

| | |
|---|---|
| Polyester M | 100 parts |
| Aluminum isopropoxide | 2 parts |
| Magnetic material (EPT-1000, produced by Toda Kogyo) | 60 parts |
| Low molecular weight polyethylene (M.W. = 3000) | 2 parts |

After the above components were blended, the resultant mixture was melt and kneaded on a roll mill, coarsely crushed by a hammer mill, micropulverized by a ultrasonic jet mill, followed by classification by a wind force classifier to remove fine and coarse powders and obtain a powdery product for toner with particle sizes of 5 to 20 μ.

After 0.5 part by weight of a hydrophobic colloidal silica was added to and mixed with 100 parts by weight of the powdery product, it was supplied to a commercially available dry system copying machine (NP-200 J, produced by Canon) for carrying out a prolonged continuous copying test of 10,000 sheets of A3 size. As the result, images of good quality which are very clear without ground fog were obtained, and this state was maintained until the end without any problem with respect to image quality as durability. After the copying test, the fixer was dismantled for examination of the contamination of the fixing roller and the cleaning blade for removal of off-set materials, whereby it was found that the roller was not substantially contaminated and the amount of off-set materials on the blade was small to be no obstacle in practical application. There was also no bad image or back contamination of papers among the images of 10,000 sheets of copying tests.

Then, the toner was subjected to measurement of melt-flow characteristics by a flow tester (CFT-500 produced by Shimazu Seisakusho) to find that it had a flowing point (Tf) of 118° C. and a melt-flow viscosity at 110° C. of $4.3 \times 10^5$ poise.

EXAMPLE 16

Example 15 was repeated except that 1.5 parts of aluminum isopropoxide were used. The results of the continuous copying test were very good similarly as in Example 15.

As to the melt-flow characteristics by a flow-tester, the flowing point was 110° C. and the melt-flow viscosity at 110° C. was $7.5 \times 10^4$ poise.

COMPARATIVE EXAMPLE 10

Toner was obtained in the same manner as in Example 15 except that 1.2 parts of aluminum isopropoxide were employed, and the continuous copying test was conducted similarly as in Example 15. As the result, excellent image quality without ground fog was obtained at the initial stage, but off-set images began to appear markedly in the course of copying until a considerably bad state was observed at the end. After the end of copying, the fixer was dismantled for examination of the contamination and the amount of off-set materials deposited, whereby it was found that the back-up roller was contaminated substantially all over the surface and off-set materials accumulated in a large amount to the extent that a part thereof was almost dripped off, thus indicating a state which is not practically useful.

When the melt-flow characteristics of the toner were examined by a flow-tester, the flowing point was 104° C. and the melt-flow viscosity at 110° C. was $8.7 \times 10^3$ poise.

COMPARATIVE EXAMPLE 11

Example 15 was repeated except for using 3 parts of aluminum isopropoxide. The results of continuous copying test were substantially as bad as Comparative Example 10.

As to the melt-flow characteristics, the flowing point was 126° C. and the melt-flow viscosity at 110° C. was $1.6 \times 10^6$ poise.

EXAMPLE 17

Example 15 was repeated except that 100 parts of Polyester N were employed in place of Polyester M. The results of continuous copying test were very good similarly as in Example 15.

The melt-flow characteristics by a flow-tester were 103° C. for flowing point and $6.1 \times 10^4$ poise for melt-flow viscosity at 110° C.

EXAMPLE 18

Example 15 was repeated except that 100 parts of Polyester N in place of Polyester M and 3.0 parts of aluminum isopropoxide were employed. The results of continuous copying test were very good similarly as in Example 15.

The melt-flow characteristics by a flow-tester were 121° C. for flowing point and $5.8 \times 10^5$ poise for melt-flow viscosity at 110° C.

COMPARATIVE EXAMPLE 12

The toner obtained by repeating Example 15 except for using 100 parts of Polyester N in place of Polyester M and 3.5 parts of aluminum isopropoxide was tested similarly as in Example 15, to give the results which were substantially as bad as in Comparative Example 10.

The melt-flow characteristics were examined by a flow-tester to obtain the results of a flowing point of 132° C. and a melt-flow viscosity of $6.6 \times 10^6$ poise at 110° C.

EXAMPLE 19

Example 15 was repeated except that 3.3 parts of iron acetylacetonate were employed in place of aluminum isopropoxide. The results of continuous copying test were very good similarly as in Example 15.

The melt-flow characteristics by a flow-tester were 122° C. for flowing point and $7.7 \times 10^5$ poise for melt-flow viscosity at 110° C.

COMPARATIVE EXAMPLE 13

The toner obtained by repeating Example 15 except for using 3.6 parts of iron acetylacetonate in place of aluminum isopropoxide was tested similarly as in Example 15, to give the results which were substantially as bad as in Comparative Example 10.

The melt-flow characteristics were examined by a flow-tester to obtain the results of a flowing point of 129° C. and a melt-flow viscosity of $2.2 \times 10^6$ poise at 110° C.

EXAMPLE 20

Example 15 was repeated except for using 100 parts of Polyester P in place of Polyester M and 3.0 parts of aluminum isopropoxide. The results of continuous copying test were very good similarly as in Example 15.

The melt-flow characteristics by a flow-tester were 103° C. for melting point and $1.7 \times 10^4$ poise for melt-flow viscosity at 110° C.

EXAMPLE 21

Example 15 was repeated except for using 100 parts of Polyester P in place of Polyester M and 7 parts of magnesium oxide in place of aluminum isopropoxide. The results of continuous copying test were very good similarly as in Example 15.

The melt-flow characteristics by a flow-tester were 113° C. for flowing point and $1.4 \times 10^5$ poise for melt-flow viscosity at 110° C.

COMPARATIVE EXAMPLE 14

The toner obtained by repeating Example 15 except for using 100 parts of Polyester P in place of Polyester M and 12 parts of magnesium oxide in place of aluminum isopropoxide was tested similarly as in Example 15, to give the results which were substantially as bad as in Comparative Example 10.

The melt-flow characteristics were examined by a flow-tester to obtain the results of a flowing point of 123° C. and a melt-flow viscosity of $1.6 \times 10^6$ poise at 110° C.

COMPARATIVE EXAMPLE 15

The toner obtained by repeating Example 15 except for using 100 parts of Polyester P in place of Polyester M was tested similarly as in Example 15, to give the results which were substantially as bad as in Comparative Example 10.

The melt-flow characteristics were examined by a flow-tester to obtain the results of a flowing point of 94° C. and a melt-flow viscosity of $1.2 \times 10^4$ poise at 110° C.

EXAMPLE 22

| | |
|---|---|
| Polyester M | 100 parts |
| Aluminum isopropoxide | 2 parts |
| Low molecular weight polyethylene (M.W. = 3,000) | 2 parts |

The above materials were blended and kneaded on a roll mill. After coarsely crushing the kneaded product by a hammer mill, the crushed powders were micropulverized by a ultrasonic jet mill to obtain powders for developing of an average particle size of $8\mu$.

The powders (10 parts) and 90 parts of carrier iron powders (trade name, EFV 250/400, produced by Nippon Teppun) were mixed to provide a developer. This developer was applied for a commercially available plain paper copying machine (trade name: NP-5000, produced by Canon) to conduct a continuous copying test of 10,000 sheets of A3 size.

As the result, there were obtained very good images which are clear and without ground fog, and this was maintained continuously until the end of the test.

After the end of the test, the fixer was dismantled for examination of the extent of contamination of the roller, whereby it was found that the roller was not substantially contaminated, involving no practical problem at all.

The toner (containing no carrier) was subjected to measurement of the melt-flow characteristics by a flow tester to find that it had a flowing point of 109° C. and a melt-flow viscosity of $1.6 \times 10^5$ poise at 110° C.

COMPARATIVE EXAMPLE 16

Example 22 was repeated except for using 1.2 parts of aluminum isopropoxide. As the result, at the initial stage of the image formation test of 10,000 sheets of A3 size, there were obtained good images which were very clear and without ground fog. However, in the course of copying, off-set phenomenon appeared markedly until the off-set images appear on the transfer papers or the backside of transfer papers became contaminated, whereby the test could not but be intermitted.

After intermission, the fixer was dismantled for examination of the extent of contamination of the rollers, and it was found all of the fixing roller, back-up roller and heat-supplying roller were contaminated in black substantially all over the entire surfaces to indicate bad states.

The toner (containing no carrier) was subjected to measurement of the melt-flow characteristics by a flow-tester to find that it had a flowing point of 98° C. and a melt-flow viscosity of $3.8 \times 10^3$ poise at 10° C.

We claim:

1. A heat-fixable dry system toner powder comprising a colorast and in a binder resin a non-linearly modified low melting polyester having an acid value of 10 to 60 obtained from components containing (A) an alkyl-substituted dicarboxylic acid and/or an alkyl-substituted diol, (B) a trivalent or more polycarboxylic acid and/or a trivalent or more polyol, (C) an aromatic dicarboxylic acid, and (D) an etherated diphenol.

2. A heat-fixable dry system toner powder according to claim 1, wherein the toner further contains 0.2 to 4% by weight of an organometallic compound containing a divalent or more metal based on the binder resin.

3. A heat-fixable dry system toner powder according to claim 2, wherein the toner has the melt-flow characteristics as measured by the flow-tester of a flowing point of 100° to 130° C. and a melt-flow viscosity of $10^4$ to $10^6$ poise at 110° C.

4. A heat-fixable dry system toner powder comprising a colorant and in a binder resin a non-linearly modified low melting polyester having an acid value of 10 to 60 obtained from components containing (A) 10 to 25 wt. % of an alkyl-substituted dicarboxylic acid and/or an alkyl-substituted diol based on the polyester, (B) a trivalent or more polycarboxylic acid and/or a trivalent or more polyol, (C) 50 mole % of an aromatic dicarboxylic acid in the total acid component, and (D) an etherated diphenol.

5. A heat-fixable dry system toner powder according to claim 4, wherein the alkyl-substituted dicarboxylic acid is selected from aliphatic acids substituted with alkyl groups having 6 to 18 carbon atoms or anhydrides thereof.

6. A heat-fixable dry system toner powder according to claim 5, wherein the aliphatic acids are selected from succinic acid, maleic acid, and fumaric acid.

7. A heat-fixable dry system toner powder according to claim 4, wherein the alkyl-substituted diol is an aliphatic diol substituted with an alkyl group having 6 to 18 carbon atoms.

8. A heat-fixable dry system toner powder according to claim 7, wherein the aliphatic diol is ethylene glycol.

9. A heat-fixable dry system toner powder according to claim 4, wherein 60 mole % or more of the total amount of trivalent or more polycarboxylic acids are selected from trimellitic acid, pyromellitic acid, and anhydrides thereof.

10. A heat-fixable dry system toner powder according to claim 4, wherein 60 mole % or more the total amount of trivalent or more polyols are selected from glycerine, pentaerythritol, and sorbitol.

11. A heat-fixable dry system toner powder according to claim 4, wherein 60 wt. % or more of the binder resin is a polyester resin.

12. A heat-fixable dry system toner powder according to claim 4, wherein the binder resin contains a styrene-acrylic typre resin.

13. A heat-fixable dry system toner powder according to claim 4, wherein the toner contains 20 to 60 wt. % of an iron oxide type magnetic material.

14. A heat-fixable dry system toner powder comprising a colorant and a binder resin, containing a non-linearly modified low melting aromatic polyester having an acid value of 10 to 60 obtained from components containing (A) 30 mole % or less of an alkyl-substituted dicarboxylic acid and/or an alkyl-substituted diol in the acid or alcohol component, (B) 40 mole % or less of a trivalent or more polycarboxylic acid and/or a trivalent or more polyol in the acid or alcohol component, (C) 60 mole % or more of a dicarboxylic acid of phthalic acid type in the dicarboxylic acid component, and (D) an etherated diphenol, and 0.2 to 4 % by weight of an organometallic compound containing a divalent or more metal based on said binder resin.

15. A heat-fixable dry system toner powder according to claim 14, wherein the alkyl-substituted dicarboxylic acid is selected from aliphatic acids substituted with alkyl groups having 6 to 18 carbon atoms or anhydrides thereof.

16. A heat-fixable dry system toner powder according to claim 15, wherein the aliphatic acids are selected from succinic acid, maleic acid, and fumaric acid.

17. A heat-fixable dry system toner powder according to claim 14, wherein the alkyl-substituted diol is an aliphatic diol substituted with an alkyl group having 6 to 18 carbon atoms.

18. A heat-fixable dry system toner powder according to claim 17, wherein the aliphatic diol is ethylene glycol.

19. A heat-fixable dry system toner powder according to claim 14, wherein 60 mole % or more of the total amount of trivalent or more polycarboxylic acids are selected from trimellitic acid, pyromellitic acid, and anhydrides thereof.

20. A heat-fixable dry system toner powder according to claim 14, wherein 60 mole % or more the total amount of trivalent or more polyols are selected from glycerine, pentaerythritol, and sorbitol.

21. A heat-fixable dry system toner powder according to claim 14, wherein 60 wt. % or more of the binder resin is a polyester resin.

22. A heat-fixable dry system toner powder according to claim 14, wherein the binder resin contains a styrene-acrylic type resin.

23. A heat-fixable dry system toner powder according to claim 14, wherein the toner contains 20 to 60 wt. % of an iron oxide type magnetic material.

24. A heat-fixable dry system toner powder according to claim 14, wherein the polyester has a glass transition temperature of 50° to 80° C.

25. A heat-fixable dry system toner powder according to claim 14, wherein the polyester has a softening point of 60° to 130° C.

26. A heat-fixable dry system toner powder according to claim 14, wherein the organometallic compound is an acetylacetone metal complex.

27. A heat-fixable dry system toner powder according to claim 14, wherein the organometallic compound is a salicylic acid type metal salt.

28. A dry system toner powder for hot roller fixing, which is a toner using a polyester crosslinked with a polyvalent metal compound as the main binder resin, said toner having the melt-flow characteristics as measured by the flow-tester of a flowing point of 100° to 130° C. and a melt-flow viscosity of $10^4$ to $10^6$ poise at 110° C.

29. In a process for electrostatic imaging wherein a developed image is transferred and thereafter fixed by a hot roller, the improvement which comprises employing as a toner for developing said image, the heat fixable dry system toner powder of claim 1.

30. In a process for electrostatic imaging wherein a developed image is transferred and thereafter fixed by a hot roller, the improvement which comprises employing as a toner for developing said image, the heat fixable dry system toner powder of claim 4.

31. In a process for electrostatic imaging wherein a developed image is transferred and thereafter fixed by a hot roller, the improvement which comprises employing as a toner for developing said image, the heat fixable dry system toner powder of claim 14.

32. In a process for electrostatic imaging wherein a developed image is transferred and thereafter fixed by a hot roller, the improvement which comprises employing as a toner for developing said image, the heat fixable dry system toner powder of claim 28.

* * * * *

UNITED STATES PATENT AND TRADEMARK OFFICE
CERTIFICATE OF CORRECTION

PATENT NO. : 4,533,614

DATED : August 6, 1985

INVENTOR(S) : HIROSHI FUKUMOTO

It is certified that error appears in the above-identified patent and that said Letters Patent is hereby corrected as shown below:

Column 1, lines 45-46, change "mini-/tuarization" to --minia-/turization--.

Column 3, line 8, change "lowered" to --lower--.

Column 3, lines 26-27, change "to make avail of the advantage of" to --to take advantage of--.

Column 6, line 65, change "at the main" to --as the main--.

Column 7, line 49, change "2-methyl 12-" to --2-methyl-2--.

Column 8, line 16, change "the all dicarboxylic" to --the all-dicarboxylic--.

Column 8, line 27, change "fumeric" to --fumaric--.

Column 8, line 29, change "anhydrides of" to --anhydrides--.

Column 11, line 31, change "dependence of" to --dependence on--.

Column 11, line 63, change "preferably incorporated" to --preferably be incorporated--.

Column 12, line 6, change "additionaly" to --additionally--.

UNITED STATES PATENT AND TRADEMARK OFFICE
CERTIFICATE OF CORRECTION

PATENT NO.   : 4,533,614
DATED        : August 6, 1985
INVENTOR(S)  : HIROSHI FUKUMOTO It is certified that error appears in the above-identified patent and that said Letters Patent is hereby corrected as shown below:

Column 15, line 13, change "succenic acid" to --succinic acid--.
Column 15, line 60, change "was added" to --were added--.
Column 17, line 30, change "a ultrasonic" to --an ultrasonic--.
Column 17, line 30, change "jet miIl" to --jet mill--.
Column 17, line 52, change "as H;" to --as--.
Column 18, line 33, change "a ultrasonic" to --an ultrasonic--.
Column 20, line 66, change "was melt" to --was melted--.
Column 20, line 68, change "a ultrasonic" to --an ultrasonic--.
Column 21, line 14, change "are durability" to
        --and durability--.
Column 23, line 37, change "a ultrasonic" to --an ultrasonic--.
Column 24, line 10, change "10°C." to --110°C.--

UNITED STATES PATENT AND TRADEMARK OFFICE
CERTIFICATE OF CORRECTION

PATENT NO. : 4,533,614

DATED : August 6, 1985

INVENTOR(S) : HIROSHI FUKUMOTO

It is certified that error appears in the above-identified patent and that said Letters Patent is hereby corrected as shown below:

Claim 1, line 2, change "colorast" to --colorant--.
Claim 10, line 2, change "more the" to --more of the--.
Claim 12, line 3, change "typre" to --type--.
Claim 14, line 10, change "a dicarboxylic acid" to
    --an aromatic dicarboxylic acid--.
Claim 20, line 2, change "more the" to --more of the--.

Signed and Sealed this

Eighteenth Day of November, 1986

Attest:

DONALD J. QUIGG

*Attesting Officer*       *Commissioner of Patents and Trademarks*